US009071329B2

(12) United States Patent
Escobosa et al.

(10) Patent No.: US 9,071,329 B2
(45) Date of Patent: Jun. 30, 2015

(54) CUSTOMIZABLE AND UPGRADABLE DEVICES AND METHODS RELATED THERETO

(75) Inventors: Marcus Escobosa, Placentia, CA (US); Patrick H. Hayes, Mission Viejo, CA (US); James N. Conway, Jr., Corona Del Mar, CA (US)

(73) Assignee: UNIVERSAL ELECTRONICS INC., Santa Ana, CA (US)

(*) Notice: Subject to any disclaimer, the term of this patent is extended or adjusted under 35 U.S.C. 154(b) by 2721 days.

(21) Appl. No.: 11/601,265

(22) Filed: Nov. 17, 2006

(65) Prior Publication Data

US 2007/0063860 A1 Mar. 22, 2007

Related U.S. Application Data

(63) Continuation of application No. 10/411,792, filed on Apr. 11, 2003, now abandoned, which is a continuation of application No. 09/615,473, filed on Jul. 13, 2000, now Pat. No. 8,098,140.

(51) Int. Cl.
| | |
|---|---|
| *G05B 11/01* | (2006.01) |
| *H04B 1/20* | (2006.01) |
| *G06F 9/445* | (2006.01) |
| *G08C 19/28* | (2006.01) |
| *G08C 23/04* | (2006.01) |
| *H04N 5/44* | (2011.01) |
| *H04N 21/258* | (2011.01) |
| *H04N 21/422* | (2011.01) |

(52) U.S. Cl.
CPC *H04B 1/202* (2013.01); *G06F 8/65* (2013.01); *G08C 19/28* (2013.01); *G08C 23/04* (2013.01); *G08C 2201/20* (2013.01); *G08C 2201/21* (2013.01); *H04N 5/4403* (2013.01); *H04N 21/25816* (2013.01); *H04N 21/42204* (2013.01); *H04N 2005/4437* (2013.01)

(58) Field of Classification Search
USPC .............. 340/825.72, 5, 64, 12.22, 3.1, 4.61; 341/176; 348/14.05; 455/419
See application file for complete search history.

(56) References Cited

U.S. PATENT DOCUMENTS

| | | | |
|---|---|---|---|
| 5,410,326 A | 4/1995 | Goldstein | |
| 5,606,443 A | 2/1997 | Sgambati | |
| 6,130,726 A * | 10/2000 | Darbee et al. | 348/734 |
| 6,208,341 B1 | 3/2001 | van Ee et al. | |
| 6,211,870 B1 * | 4/2001 | Foster | 715/744 |
| 6,563,430 B1 | 5/2003 | Kemink et al. | |
| 6,829,779 B1 * | 12/2004 | Perlman | 725/37 |

FOREIGN PATENT DOCUMENTS

| | | |
|---|---|---|
| WO | WO 99/34564 | 7/1999 |
| WO | WO 00/17738 | 3/2000 |

* cited by examiner

*Primary Examiner* — Vernal Brown
(74) *Attorney, Agent, or Firm* — Greenberg Traurig, LLP

(57) ABSTRACT

A customizable and an upgradable remote control is provided which may be customized or upgraded via a Web site or through other remote, and preferably interactive, processes. A database is provided which includes a plurality of functions of a consumer electronic device, such as a TV and/or a DVD player. A user selects among the plurality of functions at least one of the desired functions. In response to the user selection a virtual configuration is created to virtually configure the customizable remote control. The virtual configuration may be downloaded to the customizable remote control.

12 Claims, 19 Drawing Sheets

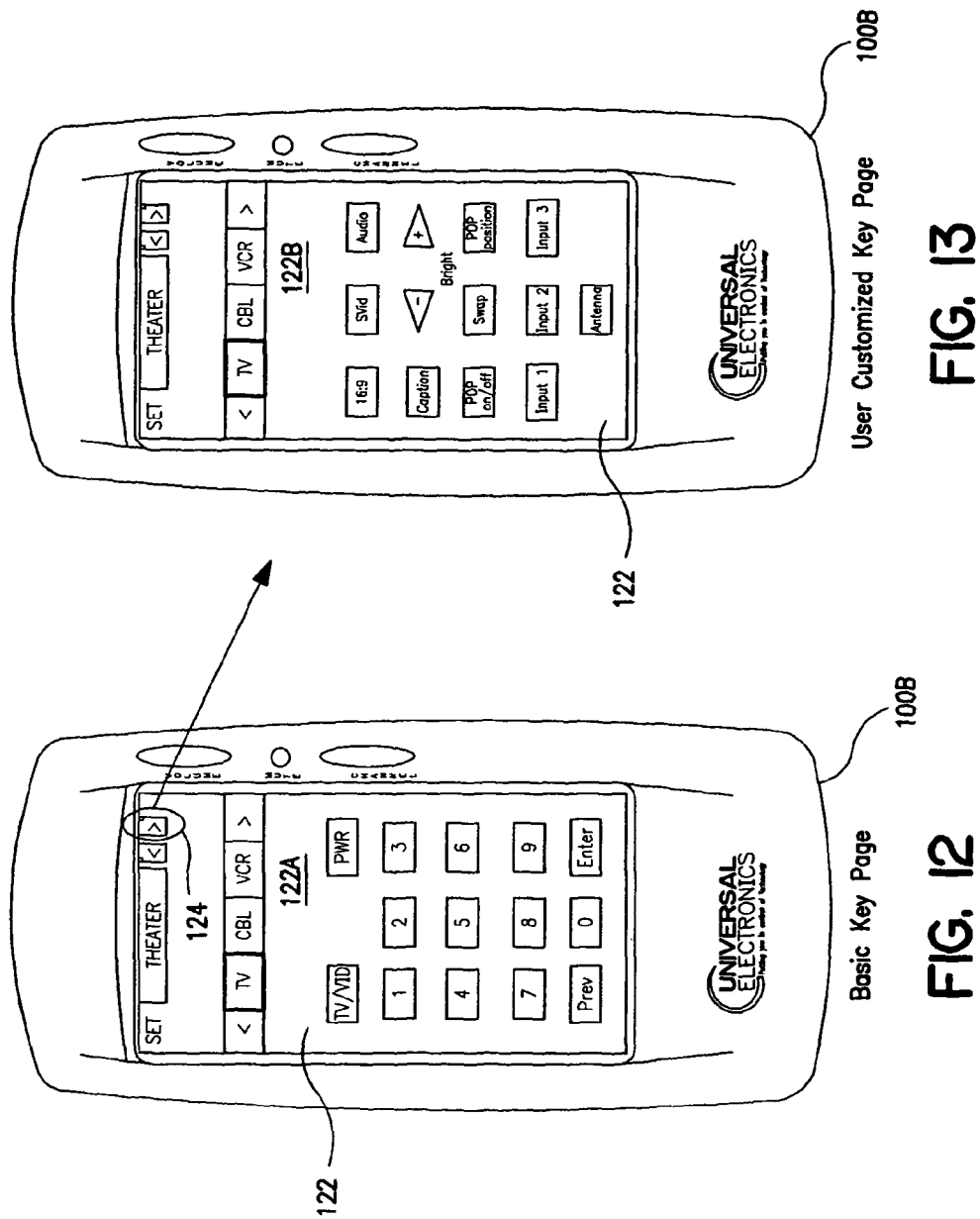

CUSTOMIZABLE AND UPGRADABLE DEVICES AND METHODS RELATED THERETO

RELATED APPLICATION

This application claims the benefit of and is a continuation of U.S. application Ser. No. 10/411,792 which, in turn, claims the benefit of U.S. application Ser. No. 09/615,473, filed on Jul. 13, 2000, which applications are incorporated herein by reference in their entirety.

FIELD OF THE INVENTION

The present invention relates to hand-held electronics and control modules, as well as electronic commerce related to these products. Specific exemplary embodiments discussed relate to hand-held remote controls.

BACKGROUND OF THE INVENTION

The description of art in this section is not intended to constitute an admission that any patent, publication or other information referred to herein is "prior art" with respect to this invention, unless specifically designated as such.

While the present invention relates to hand-held electronics and control modules generally, it will be better understood within the discussion of exemplary embodiments directed toward remote controls generally, and universal remote controls specifically. Universal remote controls typically offer a preprogrammed set of standardized keys for each device type supported. These provide for the common operational functions of the device but do not necessarily offer the full range of features available on the original manufacturer's remote.

U.S. patents and applications relevant to remote control technology include U.S. Pat. Nos. 5,515,052; 5,255,313; and U.S. patent application Ser. No. 09/418,091 filed Oct. 14, 1999, which are incorporated herein by reference. Pat. '052 discloses a universal remote control with function syntheses. The remote control comprises driver circuitry for communicating code signal generation sequences including a code generated command signal followed by a code setting signal; and memory for storing information therein. Pat. '313 discloses a universal remote control system having a signal generator to transmit signals which will cause specific functions to occur in specific controlled devices. Pat. App. Ser. No. '091 discloses means and methods for operating a remote control.

Users of universal remote controls who need access to one or more functions not preprogrammed into the unit must then use a learning capability or a feature, such as a function synthesizer (e.g., the function synthesizer discussed in Pat. '052) to add the desired extra functions to their remotes. Other U.S. Patents related to remote control technology, and in particular, relating to learning technology include U.S. Pat. Nos. 4,959,810; 5,228,077; and 5,537,463, which are incorporated herein by reference.

Pat. '810 discloses means for transferring instructions and/or data to RAM wherein the instructions and/or data is transferred from a source external to the RAM. Pat. '077 discloses a remotely upgradable universal remote control. Pat. '463 discloses means in the remote control for picking up an electro-magnetic signal from an electro-magnetic signal source and storing output signal data in memory. The output signal data stored in memory may correspond to control function data which may be transmitted to a device to be controlled.

While the above described technologies may allow users to ultimately reach the desired level of functionality, the technologies and methods often suffer from significant drawbacks. For example, learning is generally only possible if the original remote control is available—if the original remote control is lost or broken, a learning system generally cannot be used. Another problem is that function synthesizer codes must generally be obtained from a live customer service representative for the specific brand and model of device the user owns. This requirement to interface with a live merchant or supplier, often results in greater cost. Also, both learning and synthesizer data require storage space in the remote control's nonvolatile memory. The nonvolatile memory can become full. This limits the amount of learned or synthesized data which can be stored. For example, a combination of programmed command sets may be required to obtain the desired functionality, but only a portion of the command set is loadable. The remaining sets may not be able to be loaded onto the remote control because the portion of command sets has already filled the memory. Therefore, all desired sets of preprogrammed data may not fit in memory. Additionally, key legends, (e.g., identifications) on the remote control, do not generally indicate the added functions. The more one attempts to customize a remote, the more difficult key identification becomes. The user must remember where each function was placed.

In practice, many users do not bother to program their remote control. They either learn to live "mildly dissatisfied" with the remote control "as is" or abandon the universal concept entirely in favor of purchasing the same brand of equipment across the board and using that manufacturer's (i.e., brand of) unified remote. This preference for single-brand use has been shown through use of focus groups in which the participants indicated that they owned only one brand of equipment for exactly this reason—difficulty in programming.

SUMMARY OF THE INVENTION

As the invention is in part directed toward e-commerce, U.S. Pat. No. 6,029,141, which is directed to an Internet-based system, is incorporated herein by reference. Readers will find the discussion of the terms and acronyms particularly useful. However, Pat. '141, is incorporated for all that it teaches.

The present invention addresses the above shortcomings of the universal remote control product by allowing the user to configure and purchase a personally customized remote control either via a Web site or through a computer located in the dealer's store, for example.

Accordingly, the present invention teaches a method of providing a customized remote control. A database including a plurality of functions for a consumer electronic device is provided. A user is enabled to select among the plurality of functions at least one desired function. The user is then allowed to virtually configure the customized remote control, whereby a virtual configuration is created. The virtual configuration is then downloaded to the customizable remote control to transform the customizable remote control into a customized remote control. A similar process may be used to transform an upgradable remote control to an upgraded remote control. These steps may generally be repeated as desired.

The customizable remote control, in one embodiment, comprises a case and a plurality of preprogrammed standard keys on the case. A plurality of configurable keys are included on the case. The remote control also includes a plurality of customized labels (or in some embodiments, customizable labels) corresponding to the plurality of configurable keys. The customizable remote control may also include means for assigning at least one function to at least one of the plurality of configurable keys.

Another objective of the present invention is to provide a simplified user interface. In a preferred embodiment the simplified user interface is repeatedly customizable to match a user's changing tastes and needs. The simplified user interface may comprise a remote control having a touch screen for accessing basic functionality and customized functionality and for selectively customizing one or more keys.

It will be apparent from the teachings disclosed herein that a customized consumer electronic device may be provided via a Web site. The user is allowed (and therefore, enabled as well) to access the Web site and select among a plurality of functions performable by the consumer electronic device. The user is also allowed (through provision of appropriate instructions in the remote or via the Web that provide operative capability) to create a virtual configuration for the consumer electronic device by selecting at least one of the plurality of functions. In a preferred embodiment, the customized consumer electronic device is a remote control, and the functions include control functions for controlling another consumer electronic device, e.g., a DVD player.

A method of modifying a remote control taught herein includes providing a database of function command codes, wherein the database is accessible to a user. Included in the database of function command codes is a plurality of command sets comprising function command codes corresponding to a respective plurality of consumer electronic devices. That is, the database preferably has a corresponding command set for each device. A Web site is maintained that enables a user to select at least one of the plurality of command sets via the Web site. The user is then enabled to download the at least one of the plurality of command sets.

A hand-held device may be upgraded according to a method of the present invention. In a preferred embodiment, a user is provided with a selection including a plurality of command codes maintained in a database. The database comprises command codes operable with the hand-held device. The user is enabled to download at least one of the plurality of command codes provided in the selection.

A customized hand-held device according to the present invention includes a hand-held unit, or case, and preferably having a display screen. Memory communicable with the display screen, preferably, includes at least three programming sets for respectively controlling at least three devices. At least two of the at least three programming sets are associated with a common (i.e., the same) brand, e.g., Sony. Set up programming for enabling a user to select at least one of the at least three programming sets during a set up mode is preferably stored in memory. The at least two programming sets associated with the common brand are preferably represented, e.g., displayed, in a prioritized order. In a preferred embodiment, the display screen includes a touch screen adapted to display keys. The at least one programming set preferably assigns a plurality of codes to a respective plurality of the keys. Thus, the one programming set may be used to, for example, assign Sony T.V. control functions to touch screen display keys whereby the user may control the T.V. Accordingly, in a preferred embodiment, the display screen is a touch screen.

From the foregoing it will be apparent that an objective of the present invention is to provide a user with a customizable hand held device. It is the further object of the present invention to enable to the user to customize the customizable handheld device with minimal additional human input. Further objective is to provide this customizable handheld device in the form of a remote control having a touch screen. Another objective is to provide computer readable medium, microchips, microcontrollers, etc. having operative programming and instructions for assembling a customizable remote control.

Another object of the present invention is to provide one with the ability to perform design trade-offs on a hand-held device and have a customized hand-held device provided according to those trade-offs. A further objective is to allow the ultimate user to be the one performing the design trade-offs.

Another object of the present invention is to provide a more efficient manufacturing and distribution system wherein the involvement of intermediate distributors is minimized. A further object of the present invention relates to providing handheld control devices.

Other objects and advantages in accordance with the present invention will be apparent to those of skill in the art from the teachings disclosed herein.

BRIEF DESCRIPTION OF THE DRAWINGS

In the interest of enabling one of skill in the art to practice the invention, exemplary embodiments are shown and described. For clarity, details apparent to those of skill in the art and reproducible without undue experimentation are generally omitted from the drawings and description.

FIG. 12 depicts a remote control incorporating a touch screen.

FIG. 13 depicts the touch screen remote control of FIG. 12 displaying secondary pages for accessing additional functions.

DESCRIPTION OF EXEMPLARY EMBODIMENTS

Figure 1:
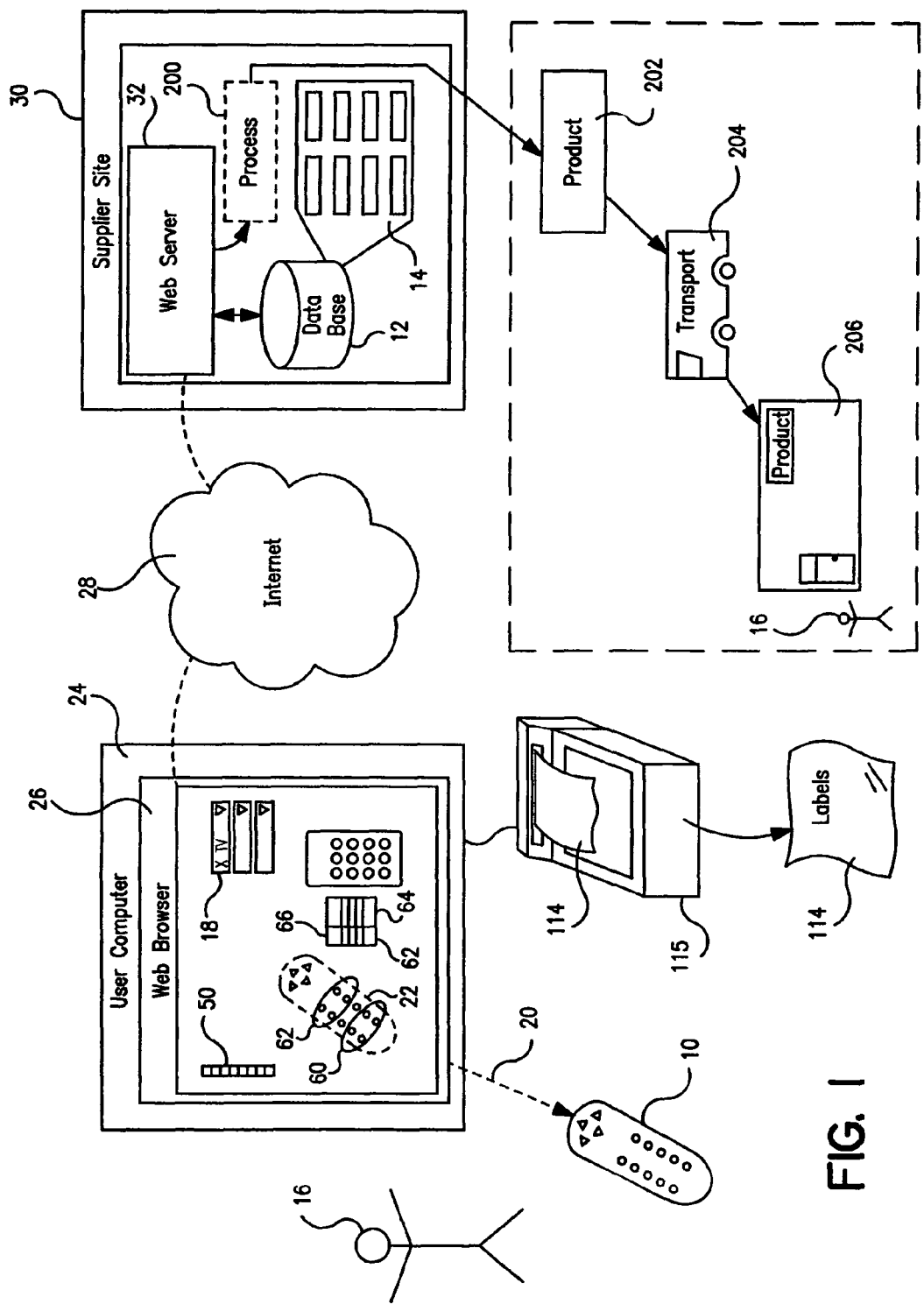
FIG. 1 schematically depicts a method of providing a customizable hand-held device according to an embodiment of the present invention.

The present invention is discussed in relation to remote controls, however, other uses will be apparent from the teachings disclosed herein. The present invention will be better understood from the following detailed description of exemplary embodiments with reference to the attached drawings, wherein like reference numerals and characters refer to like parts, and by reference to the following claims.

In one embodiment a manufacturer builds a "base" remote control (e.g., customizable remote control). The keypad of the remote will preferably include a small set of basic functions expected to be required by everyone (e.g., volume, channel, digits, and power) together with a number of blank keys (e.g., configurable keys). Provision will be made on the remote to custom label these blank keys, either via a stick-on overlay, or by some kind of transparent cover under which a paper insert can be placed, or by other compatible methods. The remote may then be sold at retail to the ultimate consumer who logs onto a Web site from home (or via a computer in a store) and enters the data on his particular devices (e.g., type, brand, model). Note that access to the data need not be confined to a path through a Web site, but may, for example, be via a direct connection (e.g., a dedicated computer or dedicated line). If the consumer is not sure about specific brand or model information of devices he wants to control, he can, for example, take the remote home and determine the desired device code by experimentation using the basic pre-programmed functions. These so-called step-and-set programming methods and other methods to identify the device of interest are well covered in the patents discussed above (and incorporated by reference).

In an alternative embodiment, the table of functions presented to the user comprises a subset of all possible functions available for the particular set-up code, said subset being automatically determined based on model number information entered by the user. For example, the total code set available for a given manufacturer (brand) format may include functions for controlling a TV picture-in-picture feature. However, if it is known that the user's particular model does not offer this feature, then the choices offered the user can be simplified by omitting these codes.

Once the devices are defined (identified), the customer is then presented with a series of screens, one for each device mode, for example, each screen showing an outline of the remote together with a table of all functions available for that particular set-up code. Using a "drag and drop" interface, for example, the user configures the blank keys on the displayed remote to contain the specific functions he desires. When completed, the computer then downloads the user's custom configuration into the remote (using a serial cable, a magnetic modem such as described in Pat. '463, or any other suitable interface).

For convenience, the user may print a label set to be installed on the remote. In an alternative labeling approach, the computer could transmit the label data (preferably as a part of the virtual configuration) to a center where a more durable label, e.g., a mylar overlay, would be pad printed and mailed to the user. As is well known in the art, the "cookie" feature of the user's browser software can be used in this application to locally store information regarding previous configuration choices for later reference by the configuring software resident on the Web site. The durable label might also be provided as an optional accessory which the user could order in addition to receiving the "on the spot" paper label. If the consumer subsequently wanted to change the key configuration or he purchased a new device to be controlled, he can simply log onto the Web site and repeat the process as often as desired to upgrade his control device. Accordingly, the user would be enabled to change a portion of the configuration while leaving, at least some, previously customized configurations unchanged.

FIG. 1 schematically represents a method of providing a customized remote control 10. Similar methodology may be used to upgrade an existing remote control. Therefore, the terms "customized remote control" and "upgraded remote control" may generally be used interchangeably, however, distinction will be made where warranted. In the method depicted in FIG. 1 a database 12 includes a plurality of functions 14 for a consumer electronic device (not shown). For example, the database may comprise a plurality of command sets including a command set for each selectable consumer electronic device. The command set includes functions (e.g., signal data which may be transmitted to the consumer electronic device) to control the devices. The user 16 is enabled (provided with the capability) to select among the plurality of functions at least one desired function 18. In FIG. 1 the desired function 18 is shown as function X for a T.V. The user then creates a virtual configuration (not shown) for the customized remote control 10 which may be downloaded to the remote control 10 as indicated by communication line 20. In one embodiment, an image 22 representing the remote is displayed. The remote 10 may be shipped to a predetermined location, such as the user's home, prior to downloading the virtual configuration. In another alternative, the virtual configuration is downloaded to a predetermined location, such as the manufacturer's factory, where the virtual configuration may be installed in, e.g., uploaded to, the remote. This may be achieved through use of a medium, e.g., a chip or memory, having the configuration stored thereon, whereby the medium is then installed. The customized remote may then be shipped elsewhere. In one embodiment, a blank unit may be shipped to a location, for example, to the user or the manufacturer, where it may be configured, or upgraded if originally shipped with data.

In the method depicted in FIG. 1 the user 16 accesses a computer 24 having a Web browser 26. The computer is connected to the Internet 28. A supplier site 30 having a Web server 32 is also connected to the Internet 28. The user 16 may, thus, access the database 12 via the supplier site 30. The supplier site is preferably the supplier's Web site, but more generally may be a location of the supplier (whether physical or virtual) which is accessed via a Web site or dedicated path.

Figure 2:
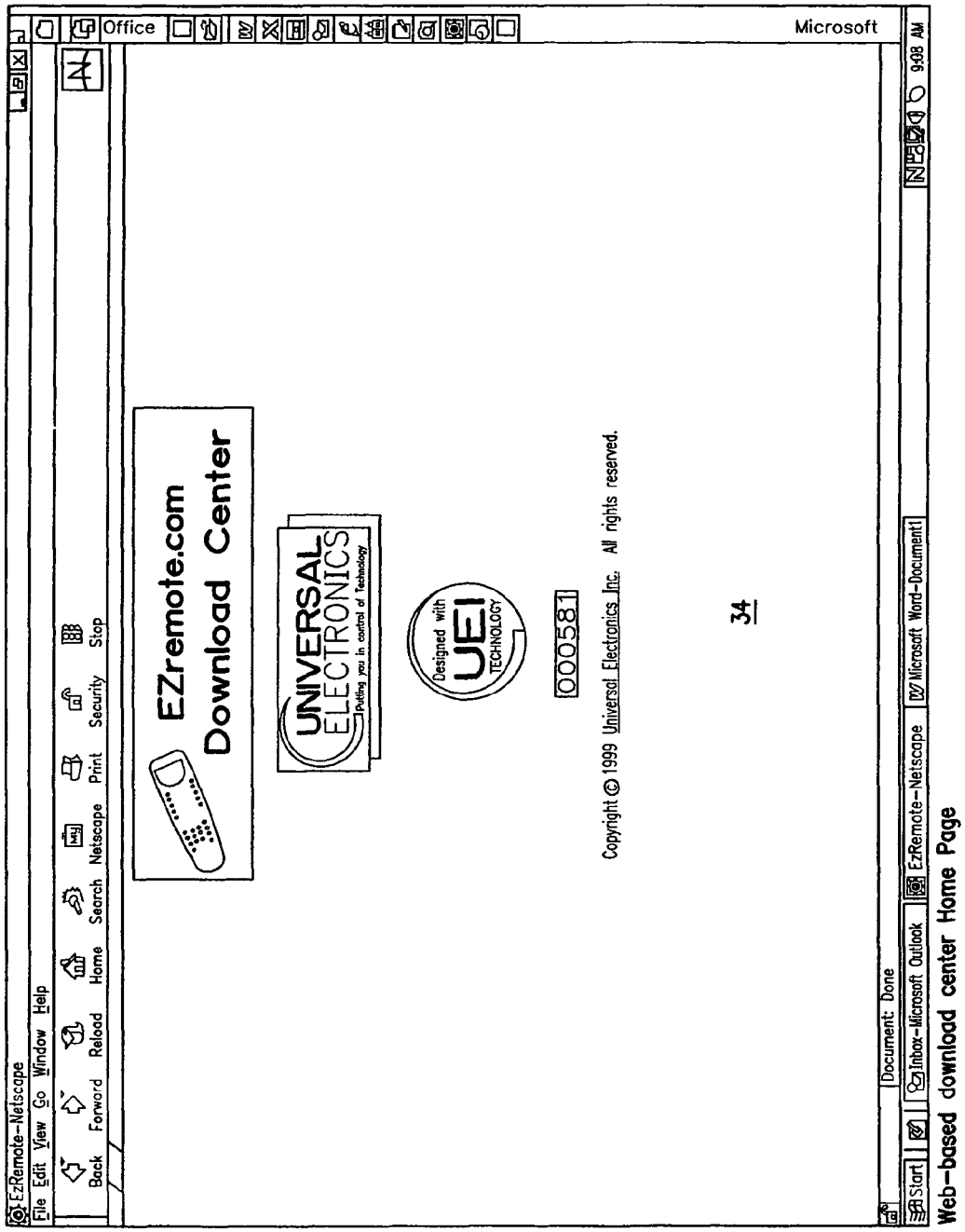
FIG. 2 depicts a home page of a Web-based download center.
Figure 3:
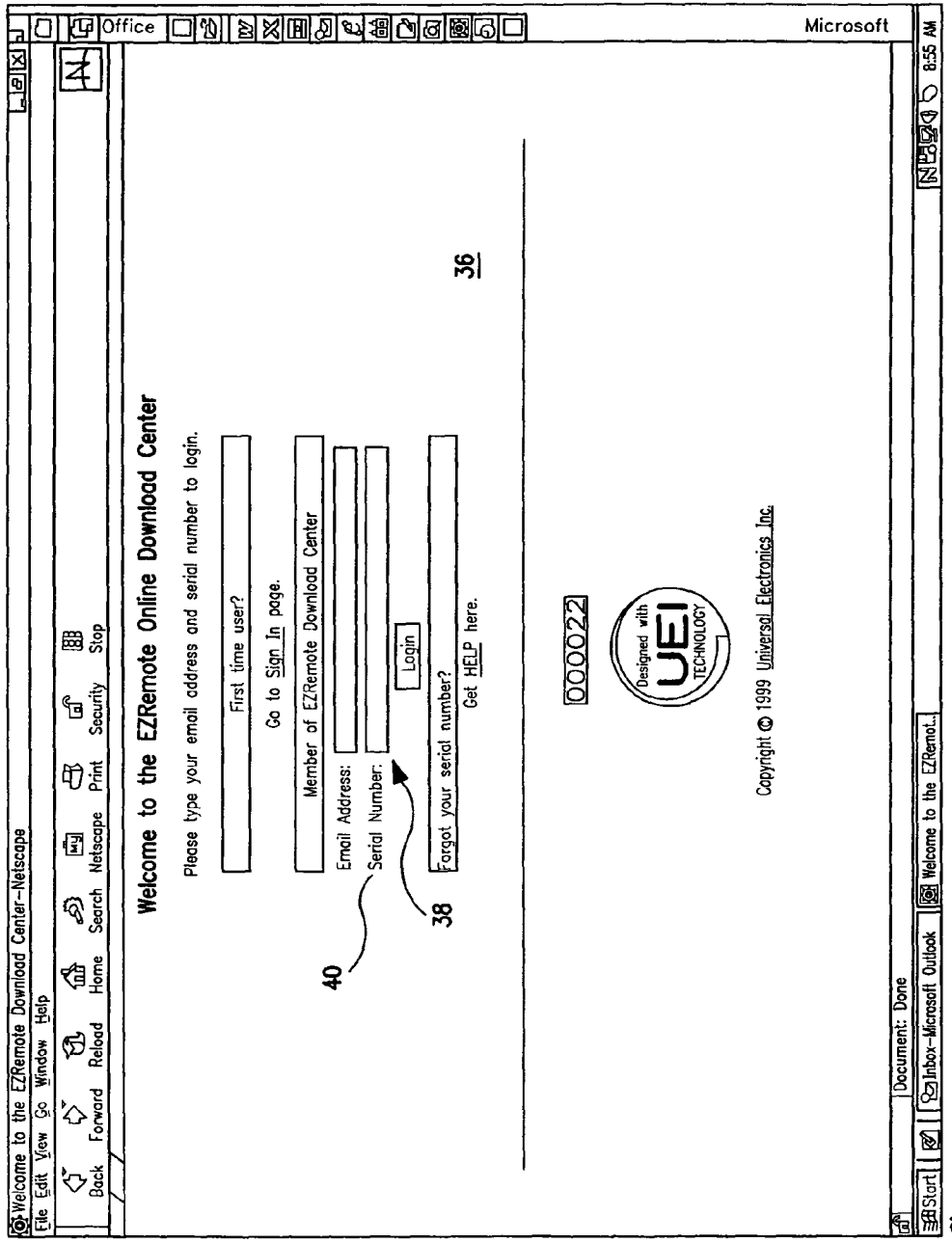
FIG. 3 depicts a sign-on screen for a supplier's Web site whereby access to downloadable functions may be obtained.

FIGS. 2-7 display Web pages (or screens) associated with the supplier site 30. FIG. 2 shows the home page 34 of a Web based download center. FIG. 3 shows a sign-on screen 36. The sign-on screen 36 includes a location 38 for receiving a unique identifier 40 of the customized remote control 10 (or upgradable remote control). In some embodiments, the function or code selection may be provided based upon the identifier 40 of the remote 10. The unique identifier 40 requested in FIG. 3 is the serial number of the remote control.

It will be appreciated that, in general, a Web site such as is shown in FIGS. 2 through 7 can be used for multiple purposes. Examples of such purposes are downloading new device types or functions, extending features, upgrading code libraries and the like, in addition to offer users an ability to create customized remote control configurations. The discussions that follow, however, will focus primarily on the customization capabilities of such a site.

Figure 4A:
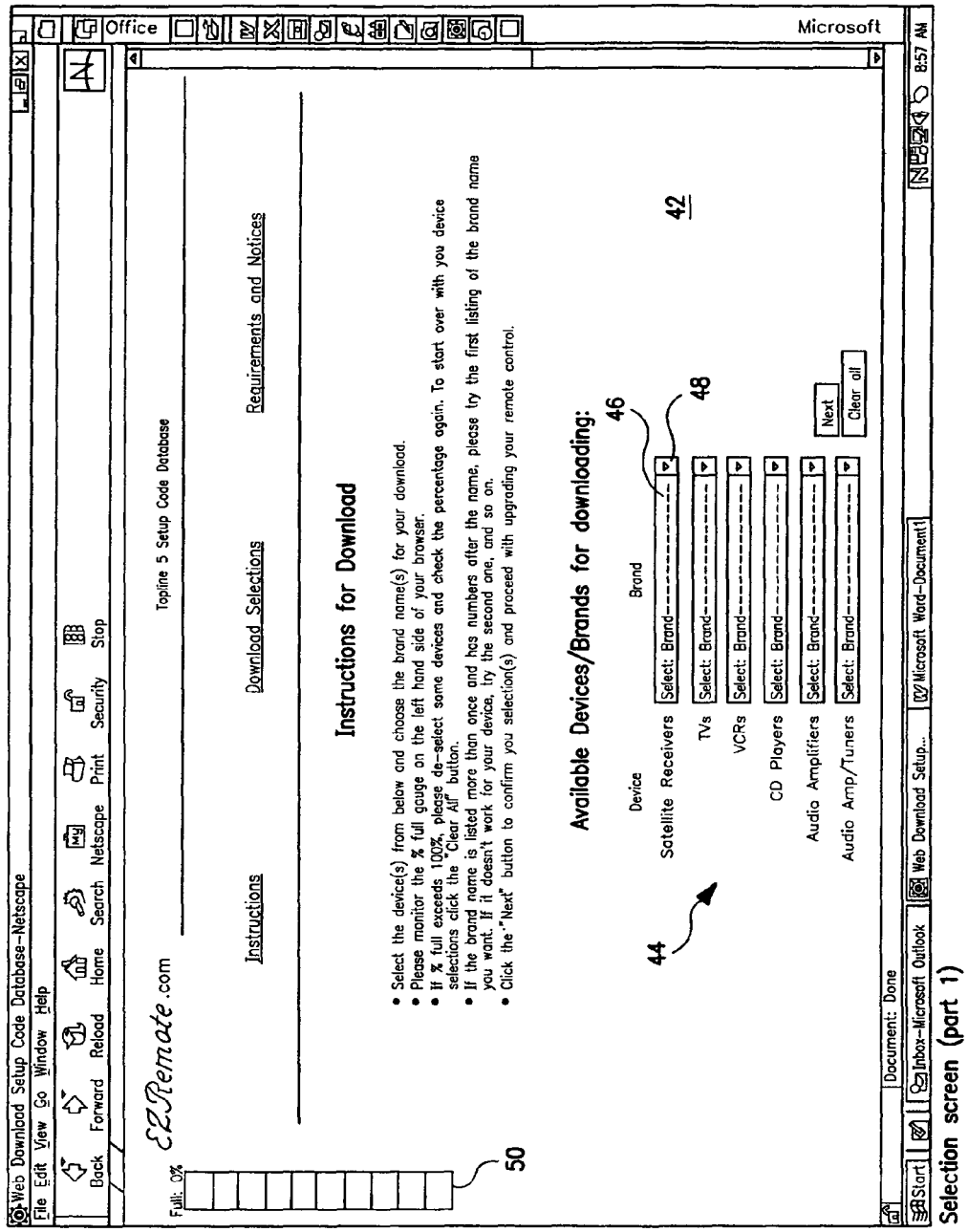
FIGS. 4(a)-4(b) depict parts 1 and 2, respectively, of a selection screen. The scroll bar is adjusted to move the page up and down in the browser frame.
Figure 4B:
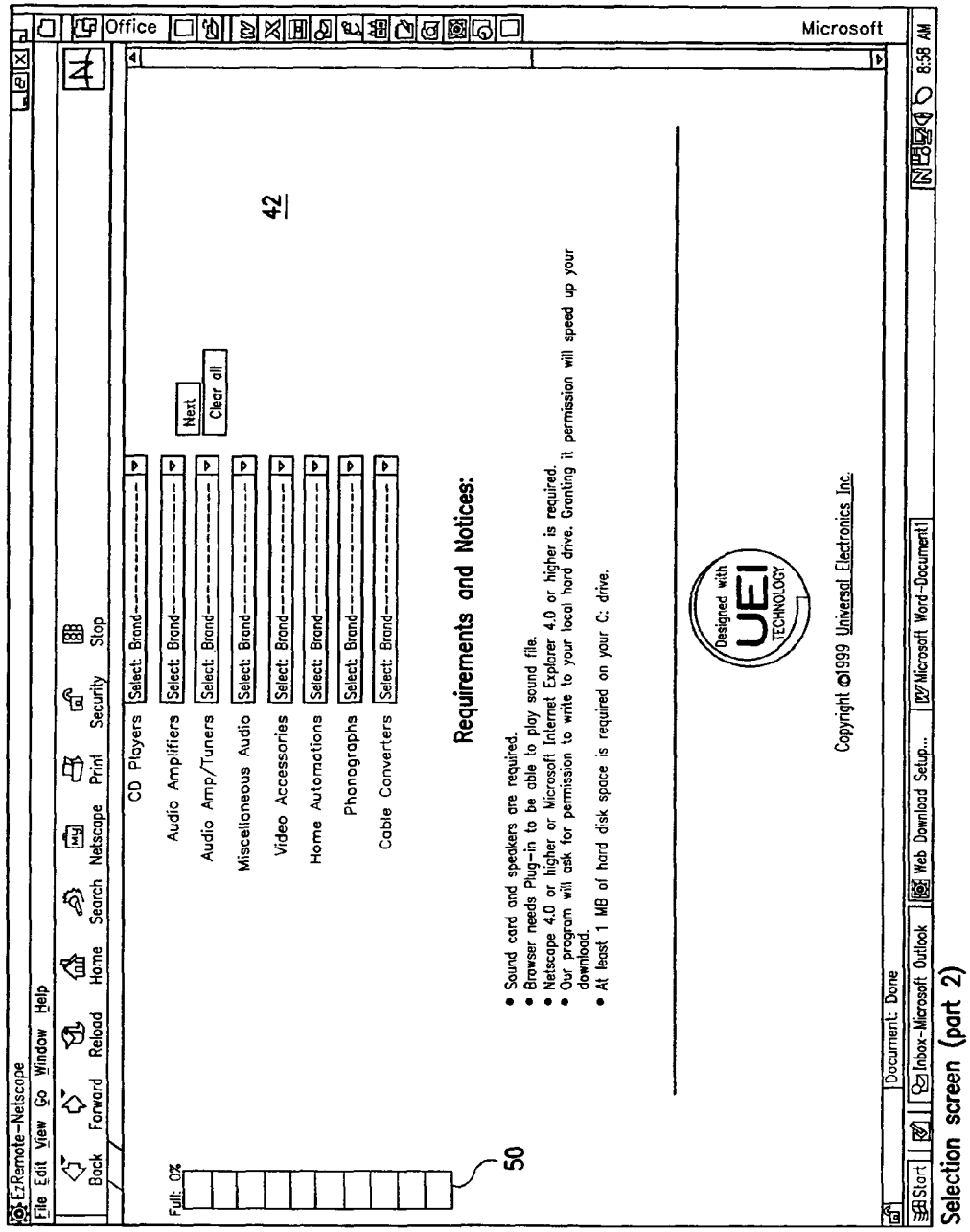

FIGS. 4(a) and 4(b) show parts 1 and 2, respectively, of a selection screen 42. FIGS. 4(a)-4(b) show a selection 44 of a plurality of consumer electronic device types, such as satellite receivers, T.V.'s, VCR's, etc. The user 16 is provided with a brand selection 46 for each type of the selection 44 of the plurality of electronic device types. Each brand selection 46 is provided via a pull down brand menu 48.

To, in part, avoid overloading memory in the customizable remote control 10, the user is provided with a memory indicator 50 indicating, preferably on a percent basis, how much memory is available in the remote 10 for adding another (or the first) device type/brand combination selection to the virtual configuration for downloading. Memory usage may be maintained locally via a "cookie" process or remotely, e.g., at the supplier's site. In another embodiment, the indicator 50 represents the amount of memory the download will use without regard to the amount of data already stored in memory. This may also be presented without regard to the capability of the particular remote being modified. As FIGS. 4(a) and 4(b) are shown prior to the user making a selection, the memory indicator 50 is shown empty.

Figure 5:
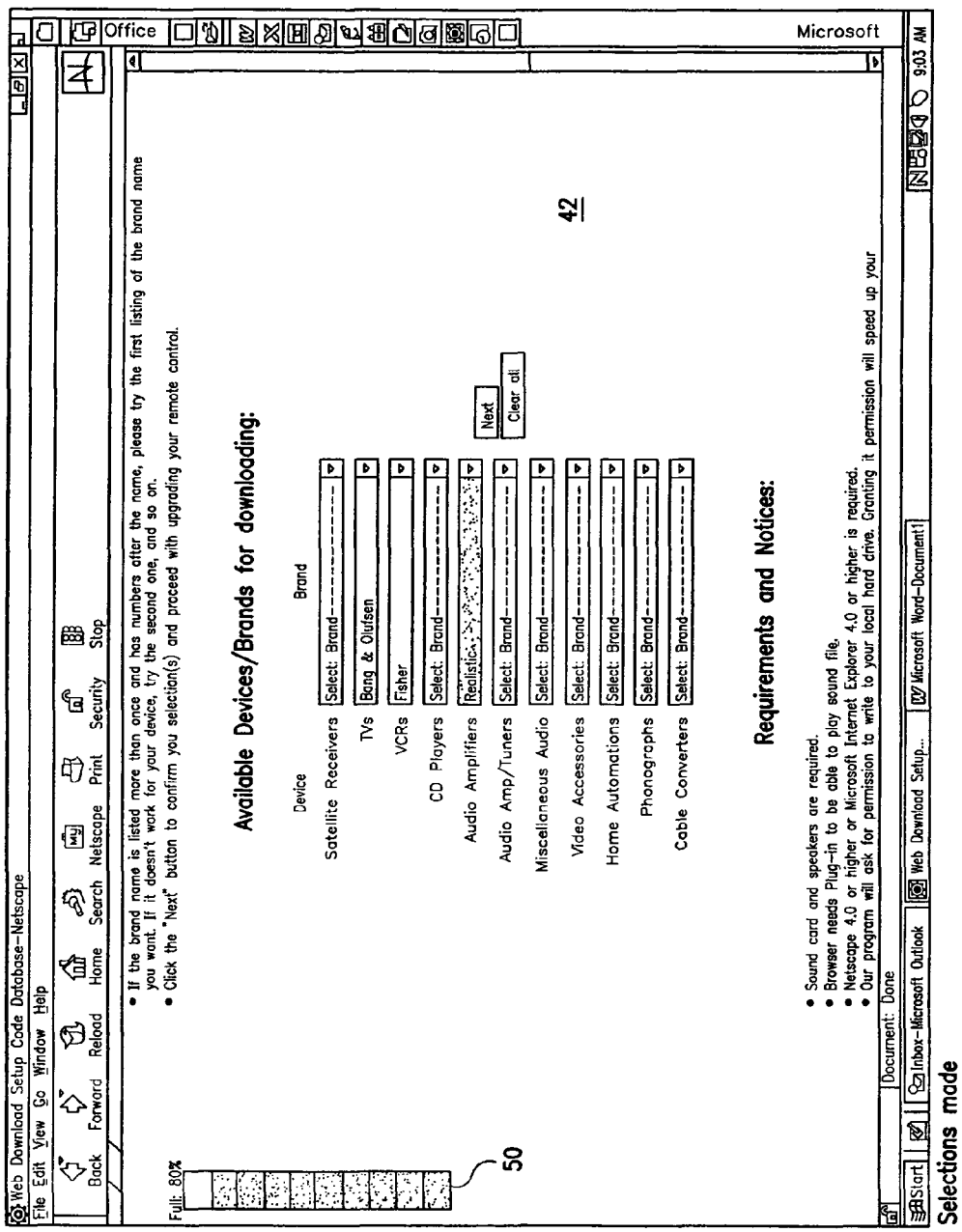
FIG. 5 depicts the selection screen of FIG. 4 after selections have been made. For clarity the screen snap shot is centered on the selections.

FIG. 5 shows the selection page 42 after brand selection has been made for some of the device types. The memory indicator 50 shown in FIG. 5 now indicates the amount of memory the virtual configuration (the download) will take. Preferably the memory indicator 50 will also indicate the available memory for storing the virtual configuration.

In the event that the brand requested has multiple possible sets of IR function codes (for example, a brand such as Sears™ or Radio Shack™ may include private label products produced by several different manufacturers), an embodiment of the invention can include a step in which multiple basic (non-customized) sets of IR codes are first downloaded into the remote and presented to the user to allow him to determine via experimentation which code is applicable to his specific device. This embodiment is particularly useful when the user does not have his device model number available, or the model number provided is not recognized by the system.

Figure 5A:
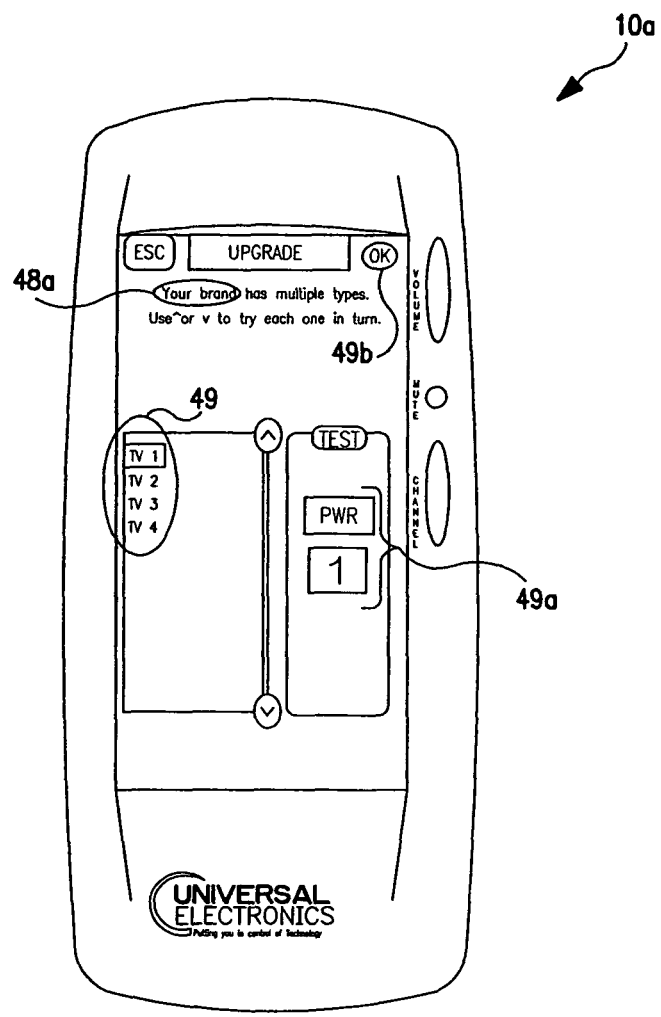
FIG. 5a depicts a remote control with a touch screen. Multiple code sets for a single brand and device type are shown with means for determining the operable code set.

FIG. 5a illustrates such a multiple code set embodiment. The remote 10a shown has been loaded (via, for example, a download process or memory installation process) with four possible code sets 49 corresponding to a brand name 48a (shown generically as "your brand") provided by the user. These codes (or more specifically, icons representing the code sets) are displayed in tabular form together with the prompt "Your brand has multiple types . . . try each one in turn" and a few test buttons 49a comprising a small subset of the full functionality of the corresponding code. The user highlights each possibility in turn and uses the test buttons ("PWR" and digit "1" in this example, although any other suitable subset can also be used) to check if that code operates his device. In a preferred embodiment, the codes to be tested are ordered by popularity, i.e. the one most likely to operate that brand of equipment/device is listed first, the next most likely listed second, and so on. Such prioritization serves to expedite the test and selection process for the majority of users (based upon popularity). Once the user has ascertained which code corresponds to his device, touching the "OK" button 49b immediately (in a preferred embodiment) sets the remote to use that basic command set. The remote may also identify to the user which set of extended commands should be requested if and when he proceeds to the next (customization) step of programming his remote.

Figure 5B:
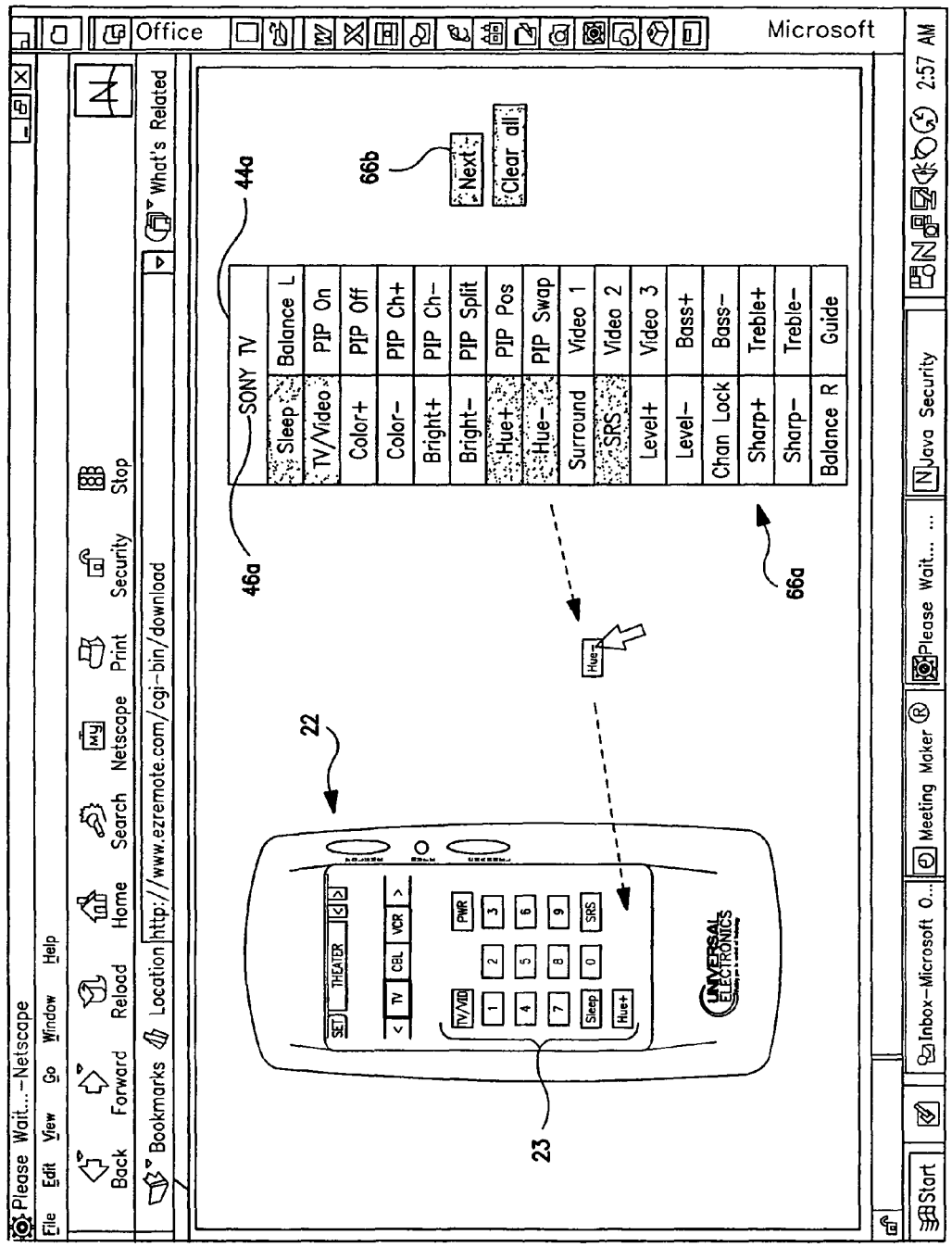
FIG. 5b depicts a customization screen where the user may configure his desired remote control key function assignment.
Figure 8:
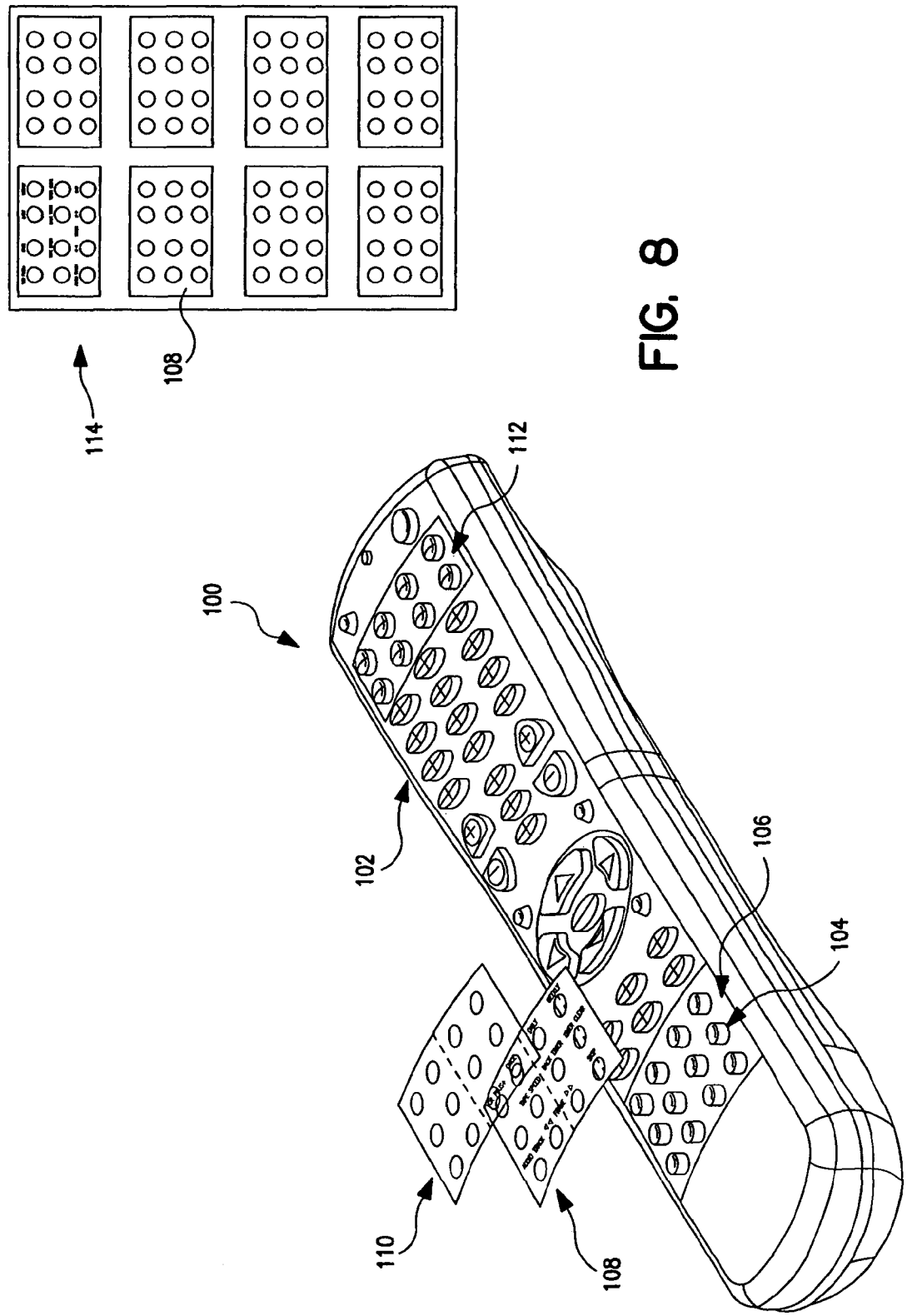
FIG. 8 depicts an image representing a customizable remote control including preprogrammed keys and configurable keys. The labeling means comprises printable (or preprinted) labels.
Figure 9:
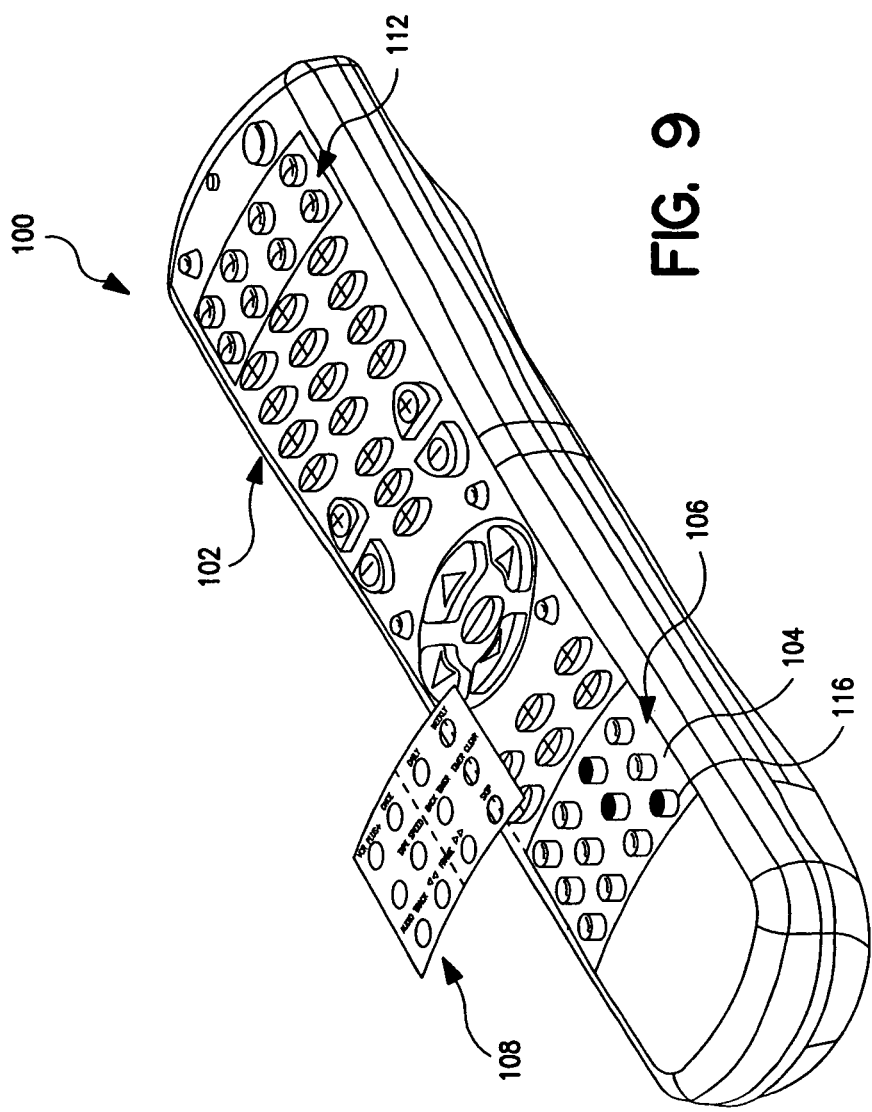
FIG. 9 depicts the remote control of FIG. 8 with configured keys indicated.

FIG. 5b shows the next step, after that shown in FIG. 5, in the process of interactive configuration of a customized remote control. Having selected device type 44a, brand 46a (and if necessary, mode) the user is now presented with a display 22 showing a representation of the universal remote control product key layout 23 together with a selection 66a of possible key functions tailored to this specific device and brand. (See also the below discussion regarding assignment table 66). The user is now able to "drag and drop" key functions onto the remote control display 22 as desired. In the example shown, the remote is displayed with certain common function pre-selected (digit keys, power) and key functions the user has already added ("TV/Video", "Sleep", "SRS", and "Hue+") to be available on this remote. FIG. 5b shows the user is in the process of dragging the function "Hue–" across his remote key layout 23. When complete, the user moves to the next step, downloading this custom configuration into his remote 10, by clicking the "Next" button 66b shown. In different embodiments, the pre-selection of common functions may be omitted to allow the user complete flexibility. Alternatively, these may be selectable as "groups" of functions instead of individual keys (for example, the digits 0 through 9, volume up/down and mute, etc.). Note that while the example shown in FIG. 5b and described above is for a remote control with an LCD touch screen capability, it should be appreciated that the configuration process for a "hard button" remote, such as shown in FIGS. 8-9, is essentially the same. Likewise for other types of touch screens.

Figure 6:
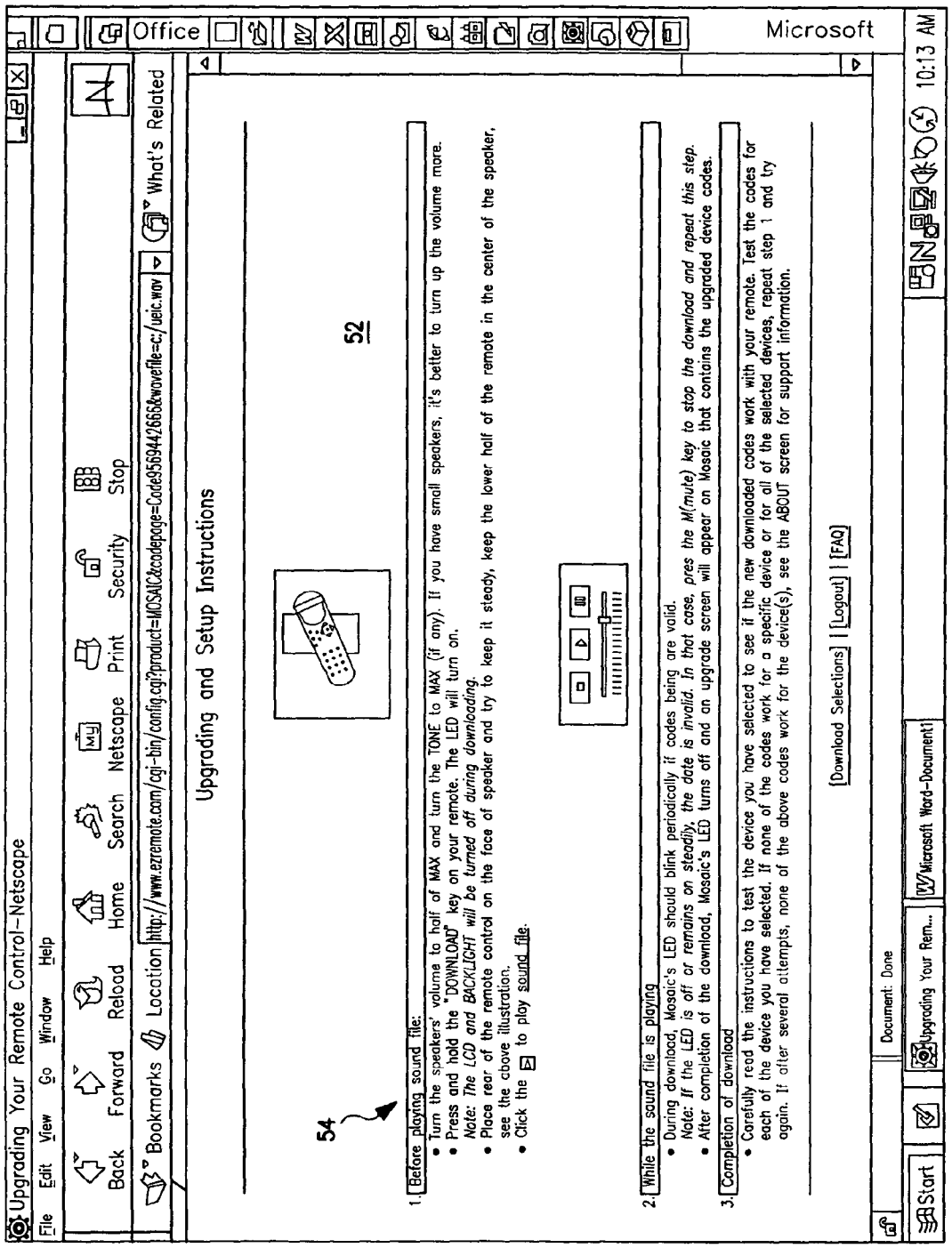
FIG. 6 depicts a download screen including instructions for downloading command code upgrades.

FIG. 6 shows a download screen 52. In the embodiment shown, the download screen 52 displays instructions 54 for downloading, during a setup mode, an upgraded code selection via the speakers of the computer. If sufficient memory is available, the user 16 may download additional command sets, either separately or in a single download. In this manner, the remote 10 may be upgraded as well as customized.

Figure 7:
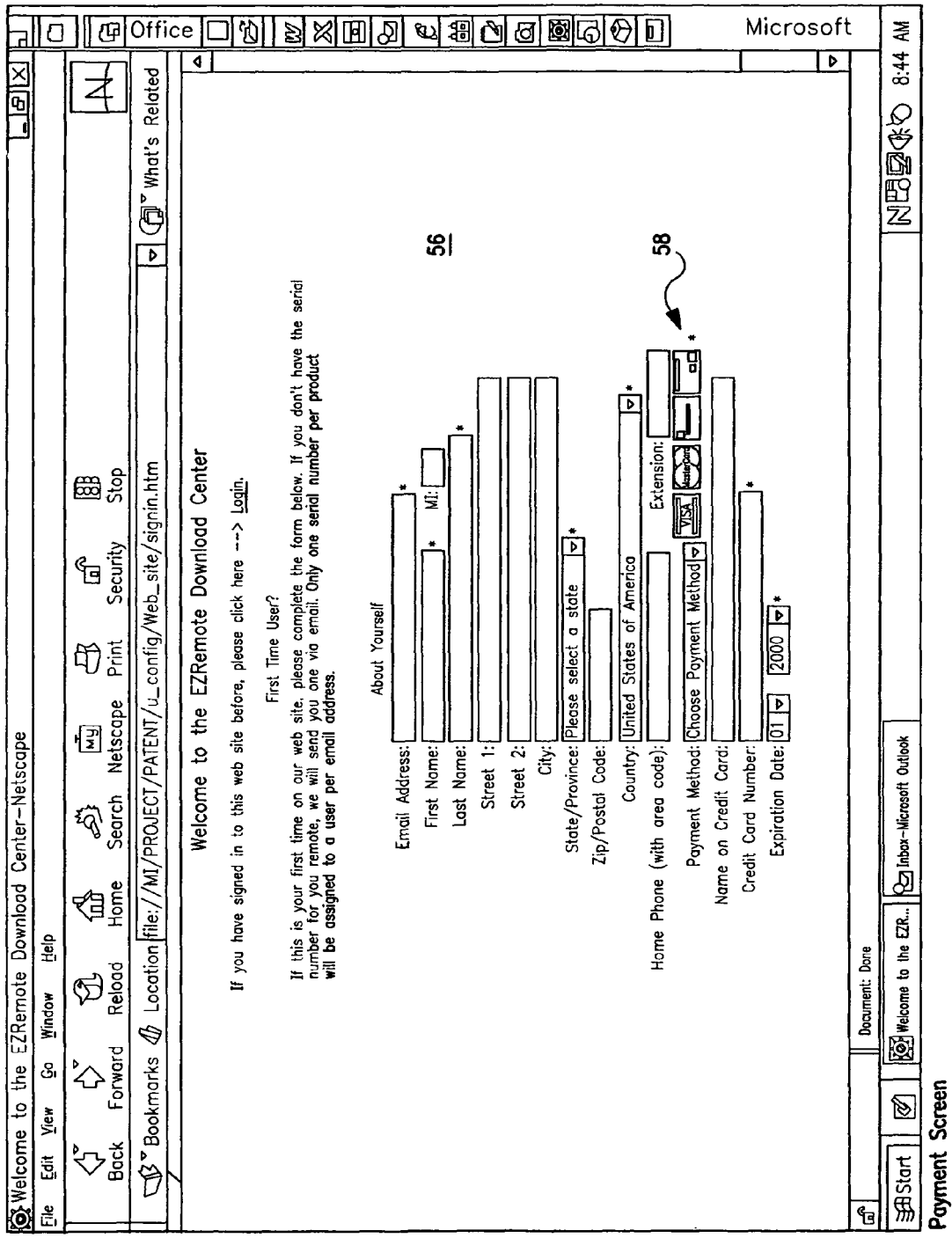
FIG. 7 depicts a payment screen.

FIG. 7 depicts a payment screen 56. In some embodiments, the payment information 58 is associated with the unique identifier 40 of the hand-held device, whereby the user 16 need only enter the payment information once, preferably, per device to be customized or upgraded. In other embodiments the one-time-entered payment information is protected via a personal-identification-number (PIN) system, for example.

Referring to FIG. 1, newly configured keys 60 are preferably indicated (see also FIG. 9). Configurable keys 62 are preferably also displayed. Note that generally the configured keys 60 are a subset of the configurable keys 62. However, in some embodiments, the keys are "one-time" configurable and thereby removed from the set of configurable keys after they are configured. In some embodiments, the one-time configurable keys may still be configured multiple times by, for example, replacing memory cards or chips, etc. In one embodiment, the configurable keys are displayed with the configured, or assigned, function 64 in an assignment table 66.

Figure 10:
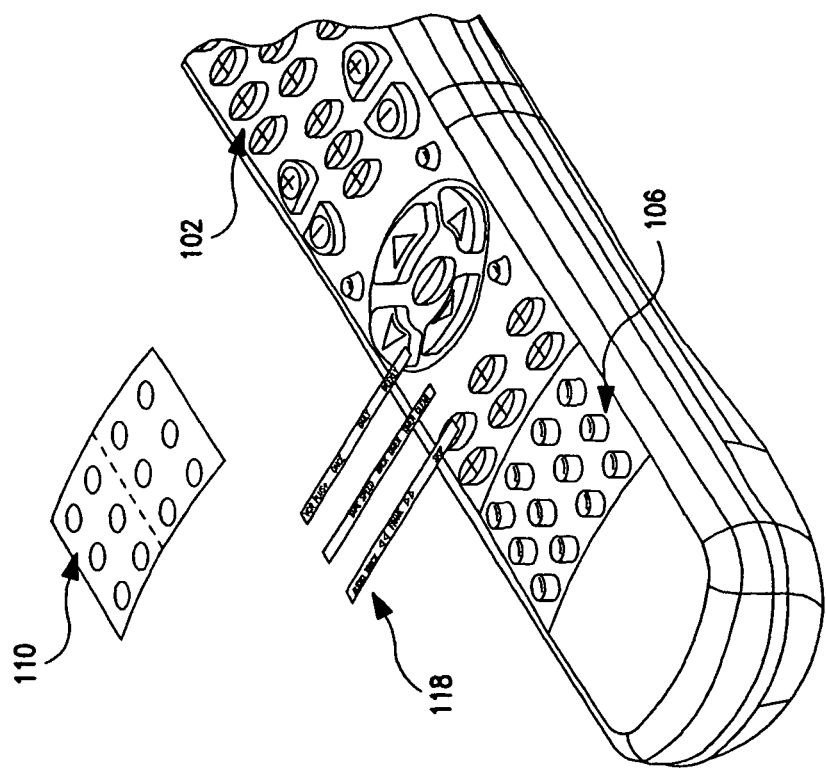
FIG. 10 depicts an embodiment of a configurable remote control wherein the labeling means comprises label strips.
Figure 11:
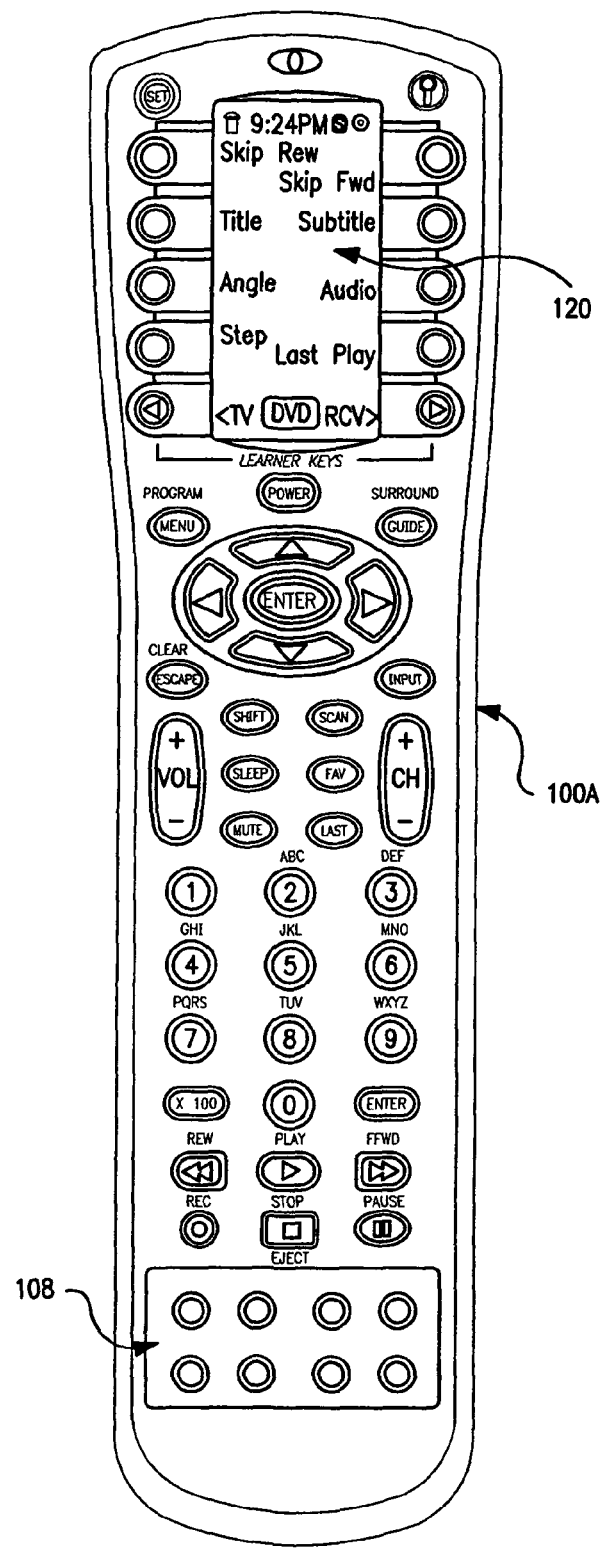
FIG. 11 depicts a customizable remote control including a display screen, wherein the labeling means includes the display screen if so programmed.

FIGS. 8-10 depict a configurable remote control 100. The configurable remote control 100 may be a customizable remote control 10 or an upgradable remote control, for example. FIG. 11 depicts a configurable remote control 100A which is an embodiment similar to that shown in FIGS. 8-10. The configurable remote control 100 includes a plurality of preprogrammed standard keys 102, a plurality of configurable keys 104 and means for assigning at least one function to at least one of the plurality of configurable keys 104. The means for assigning at least one function preferably includes means for providing the user 16 with access to the database 12 of the plurality of functions 14.

FIGS. 8-11 show a variety of means for labeling the configurable keys 104. In one embodiment, the means for labeling includes a recess 106 around the configurable keys 104, wherein the recess accommodates a label 108 and a transparent lens 110, (or protective cover 110). In the embodiment shown in FIG. 8, the label 108 is a precut, printable label and the transparent lens 110 is a clear snap-on lens. The remote 100 of FIG. 8 also includes an additional area 112 for customizing types of devices supported by the remote 100. More generally, the modes of the remote 100 may also be customized and identified. Generally, different modes will also correspond to different devices. In one preferred embodiment, the precut labels 108 are provided on carrier sheets 114. Referring to FIG. 1, the computer 24 may be connected to a printer 115 for printing labels on the carrier sheets 114.

FIG. 9 shows the configurable remote control 100 of FIG. 8 wherein the configurable keys 104 include configured keys 116. In the embodiment shown in FIG. 9, the configured keys are indicated to the user by highlighting the configured keys 116.

FIG. 10 depicts an embodiment wherein the labeling means comprises labeling strips 118. The labeling strips 118 may be preprinted with commonly requested functions or printed with downloaded functions similar to the labels 108, for example. Alternatively, the user 16 can customize the labeling strips 118 on plain paper, cut them out, position them in the recess 106 and secure them in place with the transparent lens 110. FIG. 11 depicts the configurable remote control 100A which includes a display screen 120. The display screen 120 is preferably an LCD screen. Accordingly, the labeling means may, also, or alternatively, comprise the display screen 120. An alternative embodiment uses a remote such as remote control 100B incorporating a touch screen LCD 122 as shown in FIGS. 12 and 13. In this implementation, the included basic functionality is provided on one screen, or page, 122A shown in FIG. 12, while the user selected configurable key functions are presented in one or more secondary pages 122B, accessible via a button 124 on the first page 122A, as shown in FIG. 13.

In yet another embodiment of a universal remote control, it is considered advantageous if the key layout of the universal remote could closely match that of the original remote control supplied with the user's equipment. On a conventional (i.e. hard key) universal remote, this is, of course, not possible and on these units the (fixed) key layout represents the manufacturer's best compromise at a layout suitable for as many different brands/models of original equipment as possible. Even in a remote control of the type with an LCD display and touch screen input, though the unit may have the physical capability to display a different set of key shapes/layouts for every brand/model of original equipment remote control, practical limitations prevent supporting all code combinations. For example, the large amount of memory that would be required to store all the different key shapes and layouts corresponding to every possible device model and type to be supported generally is not practical for most applications. Plus, such a unit, even if practical, would at best only have layouts for those items of consumer electronics (CE) equipment that existed at the time the unit was manufactured, and would still require generic screen layouts to support devices whose layouts are not in it's library. (Note that many CE manufacturers will use the same IR codes from model to model or year to year, even though remote designs and layouts may change.)

Figure 14:
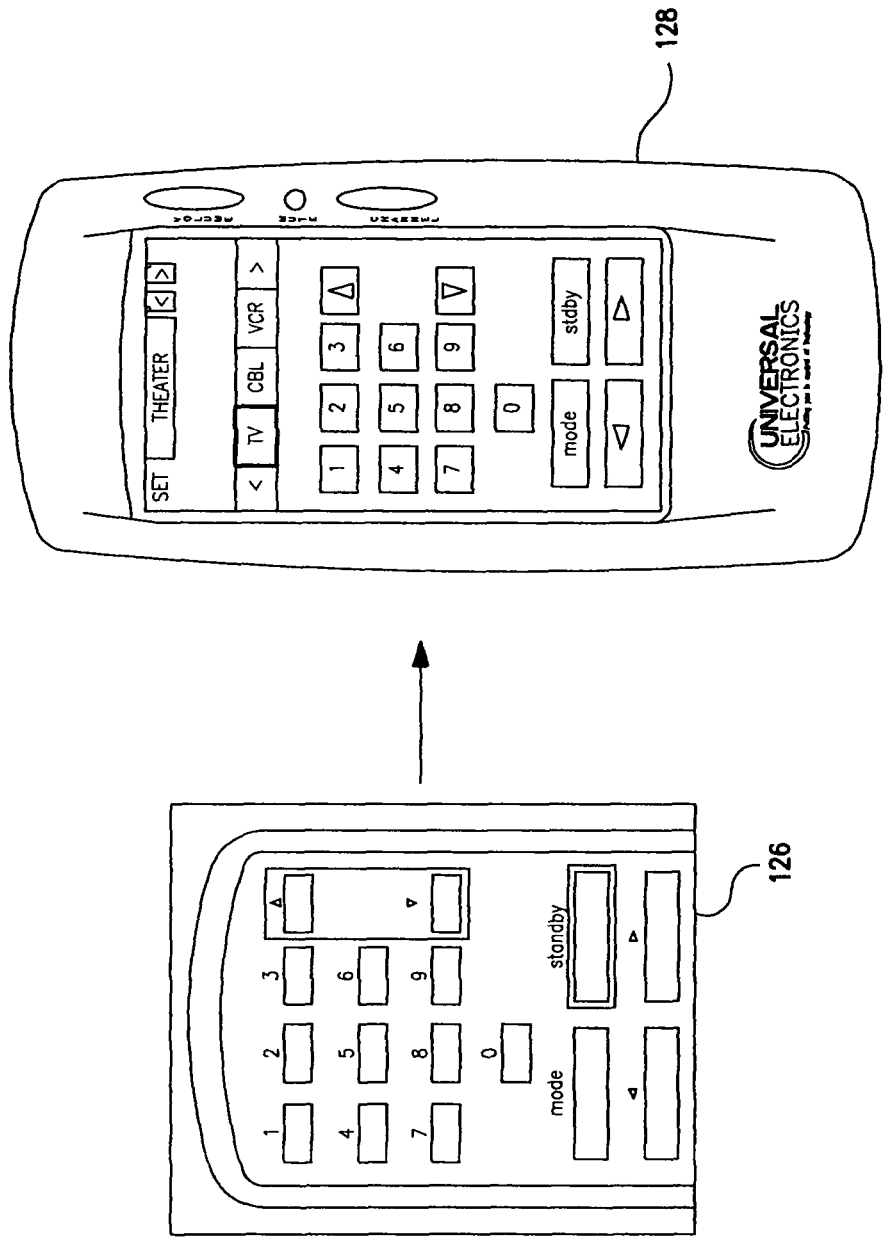
FIGS. 14-15 depict key layouts being downloaded to the corresponding touch screen remote controls.
Figure 15:
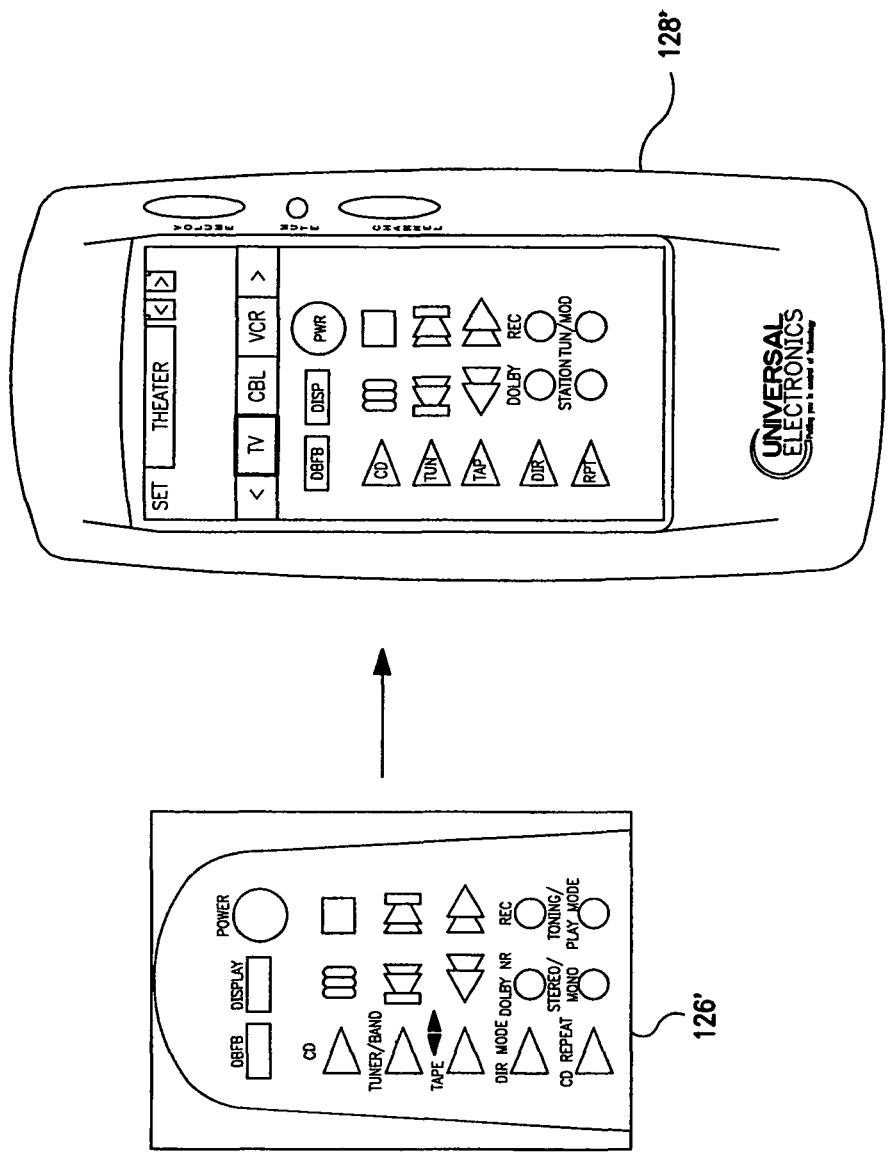

However, if individual screen layouts were available on a Web site where a consumer could browse by, e.g., brand/model until he found a matching picture of his original remote control. He could then download into the universal remote a corresponding key arrangement and memory capacity would thus not be an issue since only the layouts corresponding to the consumer's current equipment need to be stored in the remote. Examples of this approach—original remote 126 and 126' and corresponding layout on an LCD remote 128 and 128'—are shown in FIGS. 14 and 15, respectively.

In yet another embodiment of a remote control with display capability, the user accesses a Web site to download not the device IR command codes themselves, but rather sequences of pre-programmed instructions to perform various operations. These may include items such as channel tuning command sequences to facilitate tuning to a particular program on TV; pre-defined sequences for setting up or configuring consumer entertainment appliances and equipment; private access codes or numbers for use in an interactive TV environment, whereby one-time premium series such as sports events or pay-per-view moves are activated; and other applications.

In an example of pre-programmed instruction, a user who has just purchased a new home theater audio amplifier may be instructed to log onto a particular Web site where, after identifying the brand/model equipment he has just purchased, not only is the code data for that device downloaded into his remote, but also a set of instructions and remote control sequences which facilitate setup and adjustment of the system. Such instructions and sequences may, for instance, include macro sequences or steps for balancing the volume levels on the surround sound speakers, setting equalizer values to match room acoustics, etc.

Figure 16:
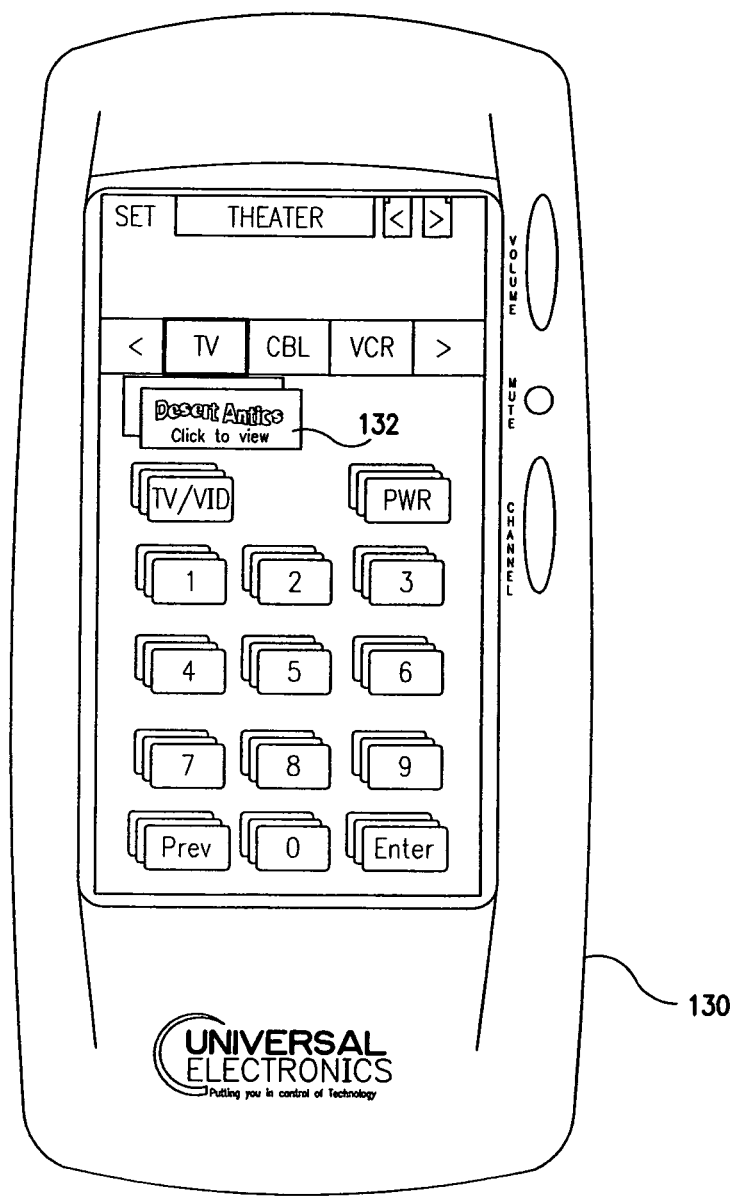
FIG. 16 depicts a remote control for use in an interactive environment. The remote control is shown with a prepaid icon for accessing an event.

Another example is discussed with reference to an interactive TV environment. A user might log onto a Web and browse a menu of available premium programming offers—sports events, recent moves, etc. In order to purchase items, the user after providing a credit card number or similar method of payment, has downloaded into his remote control an logo/icon for display on the remote LCD, together with a numeric code to be transmitted to the interactive TV (or STB) when that icon is touched. The numeric code transmitted has the effect of validating the consumer's purchase of the program and "unlocking" the receiver to allow access to it. FIG. 16 shows how such an item might appear on the remote 130 when, in this case, the user had pre-purchased the pay-per-view (PPV) movie "Desert Antics". In this depiction, the pre-paid icon 132 appears next to the same screen as the regular channel changing buttons, alternatively these paid purchase icons (PPIs) can be displayed on a separate page reserved partly or entirely for the function.

It will be appreciated that while the above descriptions and examples are presented with reference to a remote control including LCD display capability, other types of devices are also suitable: for example, PDAs of the type marketed under the trademarks Palm™, Handspring™, and others, especially when equipped with aftermarket IR remote control hardware and/or software such as is available from vendors such as Pacific Neo-Tek, Inc.

Referring to FIG. 1, a complimentary, or alternative, method of providing a hand-held device, or a component related thereto, to the user 16 is schematically shown. The supplier, through a predetermined process 200 creates a product 202 which is then transported, i.e., shipped, via transport 204, to a predetermined location 206. In a preferred embodiment, the predetermined location 206 is not only accessible to the user 16, but is co-located with the user computer 24. In alternative embodiments, the predetermined location 206 may be a store accessible to the user 16. The store may also comprise the user computer 24. The method may also be used to ship the labels 108, for example, or a permanent pre-printed mylar label, for example, or even the customizable remote control 10 or a component of the remote for later installation. The remote 10 may be shipped pre- or post-downloading the virtual configuration and pre- or post-installation of the virtual configuration.

Figure 17:
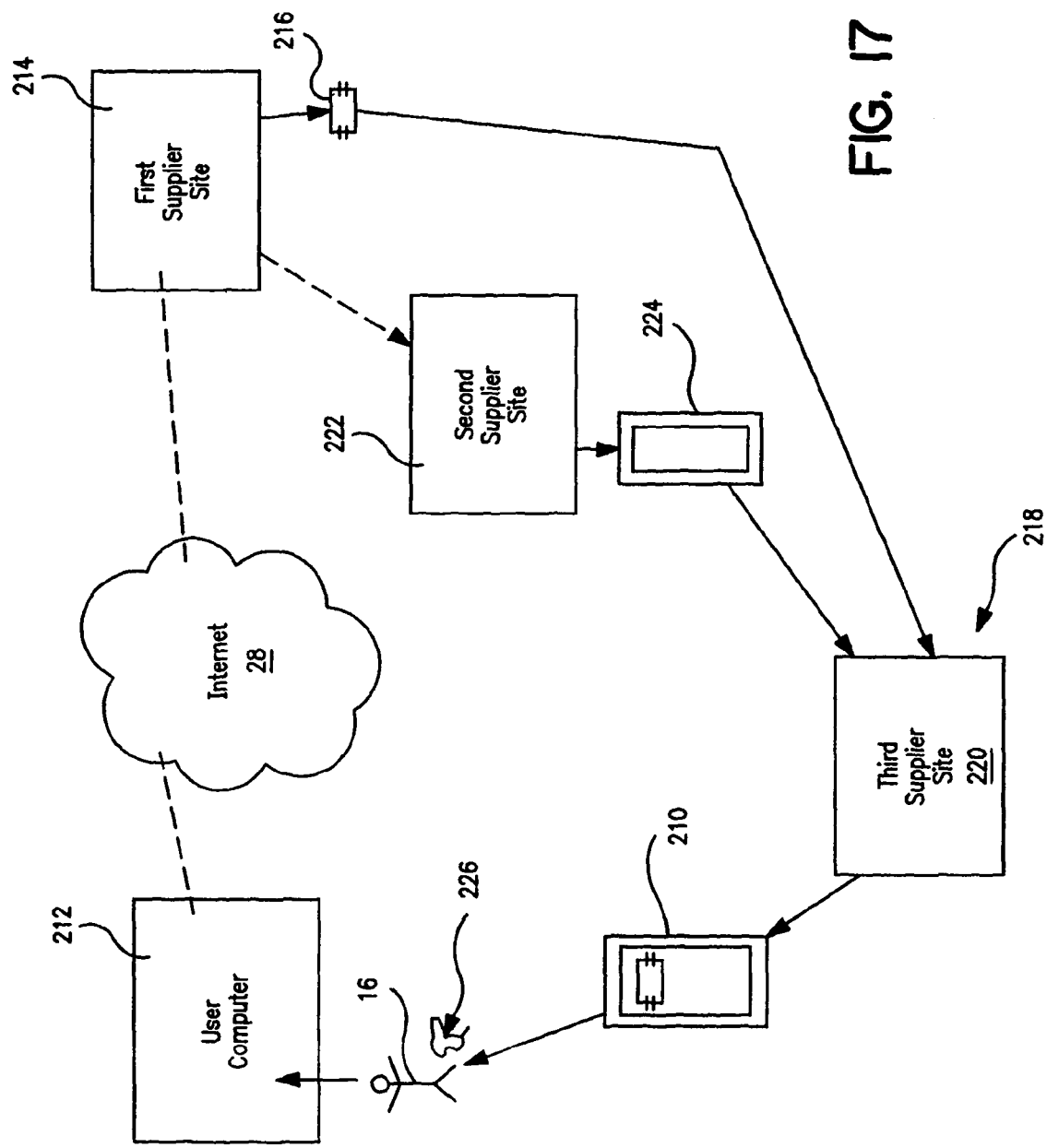
FIG. 17 schematically depicts a method of providing a user with a hand-held device.

FIG. 17 schematically depicts another approach for providing a customer 16 with a hand-held device 210. The customer 16 interfaces with the computer 212 which is connected to the Internet 28. Via the Internet 28 the customer 16 provides the first supplier site 214 with a preferred configuration (also referred to as a preferred virtual configuration). The preferred configuration may include case design, function programming, as well as key assignment, for example. The preferred configuration is downloaded, or preferably burned, into a chip 216, for example. The first supplier 214 ships the chip 216 to a predetermined location 218, which is preferably a third supplier site 220. The preferred configuration may also be transmitted to a second supplier site 222 wherein the second supplier provides a case 224, which in various preferred embodiments may be an LCD remote control such as shown in FIG. 11 or 12 or a hard key remote control such as shown in FIG. 8. The second supplier then ships the case 224 to the third supplier site 220. The third supplier then assembles the components (216 and 224) and ships the hand-held device 210 to a second predetermined site 226, the second predetermined site being accessible to the customer 16, and preferably being the home or business, for example, of the customer 16. The designations of first, second, etc. are merely used for convenience and are not intended to indicate limitations of the invention or order in an inventive process. Also, the sites may be separated or colocated, depending on the application. It should also be appreciated that the customer in this context is not necessarily the final end user of the device—he may, for example, be a store proprietor or original equipment manufacturer ("OEM") ordering one or more devices for resale.

While the invention has been particularly shown and described with reference to particular embodiments thereof, it will be understood by those skilled in the art that various changes in form and detail may be made therein without departing from the spirit and scope of the invention. The scope of the claimed invention is intended to be defined by following claims as they would be understood by one of ordinary skill in the art with appropriate reference to the specification, including the drawings, as warranted.

What is claimed is:

1. A method of customizing a remote control, comprising:
receiving at an Internet Web site first data that functions to identify a plurality of consumer electronic devices;
receiving at the Internet Web site second data that functions to identify an activity to be performed using the plurality of consumer electronic devices identified by the first data;
using the first data that functions to identify the plurality of consumer electronic devices and the second data that functions to identify an activity to be performed using the plurality of consumer electronic devices identified by the first data to cause the Internet Web site to select a pre-programmed sequence comprising instructions executable by the remote control for causing the plurality of consumer electronic devices identified by the first data to perform a plurality of operations in connection with the activity identified by the second data when a configurable key of the remote control is actuated; and
downloading the pre-programmed sequence from the Internet Web site for use in connection with the configurable key of the remote control.

2. The method as recited in claim 1, wherein the first data and the second data is received at the Internet Web site via an Internet connection.

3. The method as recited in claim 1, wherein the pre-programmed sequence comprises instructions for performing an operation associated with channel tuning.

4. The method as recited in claim 1, wherein the pre-programmed sequence comprises a code for accessing a pay-per-view broadcast program.

5. The method as recited in claim 1, wherein the pre-programmed sequence comprises instructions for performing operations associated with configuring settings of the plurality of appliances.

6. The method as recited in claim 1, wherein the first data that functions to identify the plurality of consumer electronic devices is provided to the Internet Web site via a user identifying a brand/model of each of the plurality of consumer electronic devices.

7. The method as recited in claim 6, wherein the user identifies the brand/model of each of the plurality of consumer electronic devices using a graphical user interface.

8. The method as recited in claim 1, wherein the first data that functions to identify the plurality of consumer electronic devices is retrieved from a cookie on a client computer in communication with the Internet Web site.

9. The method as recited in claim 1, comprising further downloading from the Internet Web site for use in the remote control command sets appropriate for allowing operations of the plurality of consumer electronic devices to be controlled via actuations of corresponding keys of the remote control.

10. A method of configuring a key layout of a configurable remote control, comprising:
displaying to a user via an Internet Web site a plurality of images of original equipment remote controls;
receiving at the Internet Web site data that functions to select at least one original equipment remote control represented within the plurality of images of remote controls; and
causing the Internet Web site to download for use by the configurable remote control a key layout corresponding to the at least one original equipment remote control selected according to the data received at the Internet Web site.

11. The method as recited in claim 10, wherein the downloaded key layout comprises a plurality of command codes for commanding corresponding operations of an appliance and a plurality of icons to be displayed within a display of the configurable remote control wherein select ones of the plurality of icons are mapped to select ones of the plurality of command codes such that a selection of an icon when displayed within the display of the configurable remote control causes the configurable remote control to transmit a command code that has been mapped to the icon.

12. The method as recited in claim 10, wherein the plurality of images of original equipment remote controls are browsable by the user providing a brand/model designation to the Internet Web site.

* * * * *